US007672308B2

(12) United States Patent
Montes Linares

(10) Patent No.: US 7,672,308 B2
(45) Date of Patent: Mar. 2, 2010

(54) ADMISSION CONTROL FOR DATA CONNECTIONS

(75) Inventor: Héctor Montes Linares, Granada (ES)

(73) Assignee: Nokia Corporation, Espoo (FI)

( * ) Notice: Subject to any disclaimer, the term of this patent is extended or adjusted under 35 U.S.C. 154(b) by 1542 days.

(21) Appl. No.: 10/937,902

(22) Filed: Sep. 10, 2004

(65) Prior Publication Data
US 2005/0094560 A1    May 5, 2005

Related U.S. Application Data

(63) Continuation of application No. PCT/FI03/00178, filed on Mar. 10, 2003.

(30) Foreign Application Priority Data

Mar. 11, 2002    (FI) .................................. 20020454

(51) Int. Cl.
*H04L 12/28*    (2006.01)
(52) U.S. Cl. ................... 370/395.21; 370/351; 370/332
(58) Field of Classification Search ............ 370/395.21, 370/395.2
See application file for complete search history.

(56) References Cited

U.S. PATENT DOCUMENTS

| 5,446,730 | A * | 8/1995 | Lee et al. ...................... 370/351 |
| 5,995,490 | A * | 11/1999 | Shaffer et al. ................ 370/260 |
| 6,005,851 | A * | 12/1999 | Craddock et al. ............ 370/329 |
| 6,345,038 | B1 * | 2/2002 | Selinger ....................... 370/230 |
| 6,631,122 | B1 * | 10/2003 | Arunachalam et al. ...... 370/332 |
| 6,798,745 | B1 * | 9/2004 | Feinberg ...................... 370/235 |
| 6,950,656 | B1 * | 9/2005 | Bahk et al. ................... 455/436 |
| 7,307,954 | B1 * | 12/2007 | Strandberg et al. .......... 370/235 |
| 7,346,045 | B2 * | 3/2008 | Montes Linares ........... 370/352 |

FOREIGN PATENT DOCUMENTS

| EP | 1 079 650 A2 | 2/2001 |
| EP | 1 154 663 A1 | 11/2001 |
| WO | WO 98/31177 | 7/1998 |
| WO | WO 00/01189 | 1/2000 |
| WO | WO 02/076129 | 9/2002 |

OTHER PUBLICATIONS

Xiao et al, "QoS for Adaptive Multimedia in Wireless/Mobile Networks", Proceedings of the Ninth International Symposium on Modeling, Analysis and Simulation of Computer and Telecommunication Systems (MASCOTS 2001), Aug. 15-18, 2001, IEEE Comput. Soc., pp. 81-88.

* cited by examiner

*Primary Examiner*—Phuc H Tran
(74) *Attorney, Agent, or Firm*—Mintz, Levin, Cohn, Ferris, Glovsky and Popeo, P.C.

(57) ABSTRACT

The present invention describes a method, system and network node for controlling quality of service for existing data connections using shared radio resources in a wireless communication network. The Quality Control monitors the satisfaction level of every user as well as the user satisfaction rate in the system. The purpose of this function is to indicate the degraded situation to the Admission Control. In that way, appropriate actions to counteract those situations in which the provision of QoS is not in line with the negotiated QoS for a determined amount of users can be triggered. The Quality Control indicates the Admission Control about the convenience of starting to block users that request guaranteed QoS, such as streaming service users, or non Real Time (nRT) users to avoid the degradation in the provision of QoS for those users already admitted to the system.

19 Claims, 4 Drawing Sheets

ADMISSION CONTROL FOR DATA CONNECTIONS

This is a Continuation of International Application No. PCT/FI03/00178 filed Mar. 10, 2003, which designated the U.S. and was published under PCT Article 21 (2) in English.

FIELD OF THE INVENTION

The present invention relates to mobile telecommunication systems. In particular, the present invention relates to a novel and improved method, system and network node for controlling quality of service for existing data connections using shared radio resources in a wireless communication network.

BACKGROUND OF THE INVENTION

The Radio Resource Management (RRM) e.g. in the GERAN (GSM/EDGE Radio Access Network; GSM, Global System for Mobile Communications; EDGE, Enhanced Data rates for GSM Evolution) and the UTRAN (UMTS Terrestrial Radio Access Network) are responsible for utilisation of air interface resources. The RRM is needed for e.g. maintaining the QoS (Quality of Service), planned coverage, and for offering high capacity. The RRM enables optimising service capacity and capability. The full scope of the RRM is large, and several algorithms are needed to perform various tasks. These algorithms include also Admission Control (AC).

The purpose of admission control is to ensure that there are free radio resources for the intended call or session with required signal-to-interference ratio (SIR) and bit rate. Admission control is always performed when a mobile station initiates communications in a new cell, either through a new call or handover. Furthermore, admission control is performed when a new service is added during an active call. In general, the admission control procedure ensures that the interference created after adding a new call does not exceed a prespecified threshold.

Admission control needs to be done separately for uplink and downlink direction. This is especially important if the traffic is highly asymmetric. Typical criteria for admission control are call blocking and call dropping. Blocking occurs when a new user is denied access to the system. Call dropping means that a call of an existing user is terminated. Call dropping is typically considered to be more annoying than blocking.

If the air interface load is allowed to increase excessively, the coverage area of the cell is reduced below the planned values, and the quality of service (QoS) of the existing connections cannot be guaranteed. The QoS is the idea that transmission rates, error rates, delay, and other characteristics that can be measured, improved, and, to some extent, guaranteed in advance. The QoS is of particular concern for the continuous transmission of video and multimedia information. Transmitting this kind of content dependably is difficult in public networks using ordinary "best effort" protocols. Before admitting a new connection, the admission control needs to check that the admittance will not sacrifice the planned coverage area or the quality of the existing connections. Admission control accepts or rejects a request for establishing a radio access bearer in the radio access network. The admission control functionality is located in the Radio Access Node (RNC) in the Universal Mobile Telecommunication System (UMTS) where the load information from several cells can be obtained. The admission control algorithm estimates the load increase that the establishment of the bearer would cause in the radio network. The requesting bearer can be admitted only if both uplink and downlink admission control admit it, otherwise it is rejected because of the excessive interference that is would be generated in the network. The limits for admission control are set by the radio network planning.

To support services that require some guarantees (e.g. multimedia streaming services) means that the radio access network (in the RNC and Base Station System (BSS)) needs to guarantee certain QoS in terms of throughput and delay. If some guarantees are needed, then radio resource reservation is required. Therefore, admission control can be used to calculate what network resources are required to provide the requested QoS, to determine if resources are available, and to reserve them.

During the connection the usage of radio resources are monitored by a Quality Control (QC) function, which makes sure that the provided QoS is in line with the negotiated ones, i.e. which tackles degraded situations to maintain the QoS for the most of the users at the expense of a few users' QoS. In case of real time (RT) traffic, if the target throughput cannot be achieved, QoS renegotiation might be necessary.

The main problem is that there is a need for different treatment in the admission control for streaming data flows sharing the same radio resources and experiencing different radio link conditions. The reason for that is that streaming connections are using shared Medium Access Control (MAC) mode, with the aim of increasing the resource utilisation, but at the same time these connections have real time requirements, such as guaranteed bitrate. Since determined radio link conditions lead to a determined experienced throughput, each connection needs to be managed separately to assure that the negotiated QoS requirements are fulfilled.

SUMMARY OF THE INVENTION

The present invention describes a method, system and network node for controlling or maintaining quality of service for existing data connections using shared radio resources in a wireless communication network. The wireless communication network is e.g. the UMTS.

The Quality Control monitors the satisfaction level of every user as well as the user satisfaction rate in the system. The purpose of this function is to indicate the degraded situation to the Admission Control. In that way, appropriate actions to counteract those situations in which the provision of QoS is not in line with the negotiated QoS (defining the value considered for degradation, i.e. user satisfaction criteria) for a determined amount of users (i.e. user satisfaction rate threshold) can be triggered. The Quality Control indicates Admission Control about the convenience of starting to block users that request guaranteed QoS, such as streaming service users, or non Real Time (nRT) users to avoid the degradation in the provision of QoS for those users' already admitted to the system.

Therefore, some changes in the admission control policy are one of those possible counteracting actions triggered by the Quality Control when QoS degradation is perceived. In the present invention, the Admission Control evaluates previous indications from the Quality Control in order to deal properly with streaming connections when problems occur.

The present invention manages several streaming data flows sharing radio resources, based on calculating the used capacity by the ongoing connections and estimating the needed capacity by the incoming one. For that purpose, a safety margin concept is defined to take into account the variation of radio link conditions. This parameter may be different for each type of connection (i.e. the safety margin for gold users is bigger than the one for bronze users) and it is dynamically updated, depending on Quality Control feedback.

In a preferred embodiment of the present invention, after the Quality Control feedback, the Admission Control will be able to use different safety margins depending on the QoS provisioning that the different ongoing connections are experiencing, so that the system is able to provide the required Quality of Service (QoS) for the most of the streaming users by blocking some users.

The present invention improves the user satisfaction ratio for streaming users since Admission Control also avoids incoming connections to affect ongoing ones. In the present invention, both Admission Control and Quality Control functionalities work coordinated preventing the users from being unsatisfied.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
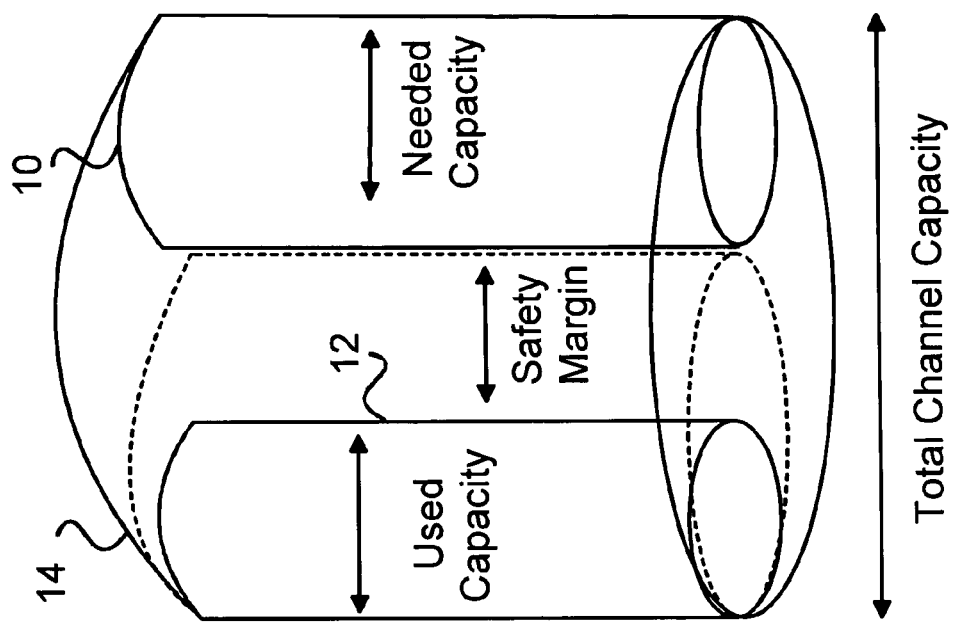
FIG. 1 illustrates the safety margin concept for those connections that require guaranteed bit rate.

FIG. 1 illustrates the safety margin concept for those connections that require guaranteed bit rate. A channel in a wireless communication network has a certain maximum capacity for data connections. To support services that require some guarantees (e.g. multimedia streaming services) means that the radio access network (in the RNC and BSS) needs to guarantee certain QoS in terms of throughput and delay. If some guarantees are needed, then radio resource reservation is required.

The largest cylinder 14 refers to the total channel capacity. The sum of the capacities of different data connections cannot exceed the total channel capacity. The cylinder 12 illustrates the capacity used by the data connections on the channel. The cylinder 10 refers to the capacity that is needed for a new data connection. The safety margin is used to depict the excess capacity that is assigned to the existing (streaming) data connections. The safety margin is defined as a percentage of channel capacity that is used as additional used capacity in the admission control algorithm calculations. Hence, an admission request would be accepted if the needed capacity 10 is lower than used capacity 12 plus the safety margin. In case that the needed capacity 10 would be higher, the connection would not be admitted.

Figure 2:
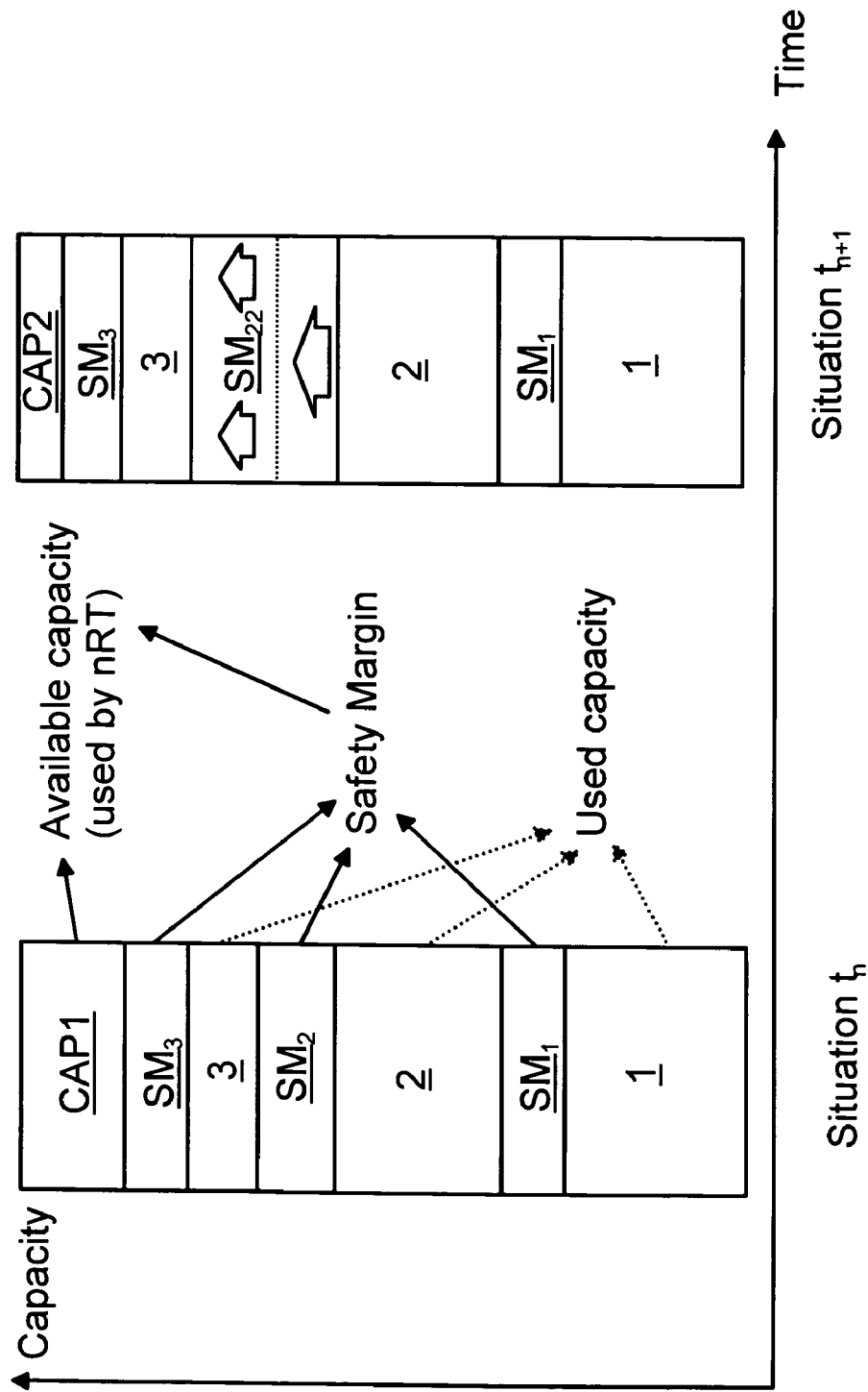
FIG. 2 illustrates one embodiment of using safety margins.

FIG. 2 illustrates one embodiment of the present invention. FIG. 2 comprises three connections (1,2,3), their corresponding safety margins ($SM_1$, $SM_2$, $SM_3$), and available capacity (CAP1, CAP2) in two different moments of time ($t_n$ and $t_{n+1}$).

When the Quality Control notices that the experienced throughput for a streaming connection is less than the negotiated as guaranteed throughput, and this situation lasts a determined period of time, some actions to counteract such event are triggered. The Admission Control modifies its admission policy related to those connections able to share the resources of the aforementioned connections with throughput troubles. FIG. 2 shows how the Admission Control increases the safety margin for connection 2 (from $SM_2$ to $SM_{22}$) in order to avoid new connections being allocated to the same channels (i.e. stop admission of connections which are going to affect the ones in trouble because they both are sharing the bandwidth). The situation in $t_n$ and $t_{n+1}$ differ from each other in many ways. Because connection 2 needs more capacity (scheduling time) to achieve the negotiated bit rate, its safety margin is increased (from $SM_2$ to $SM_{22}$). At the same time available capacity for other connections is reduced from CAP1 to CAP2. The connections 1 and 3, and their corresponding safety margins ($SM_1$ and $SM_3$) do not change.

Figure 3:
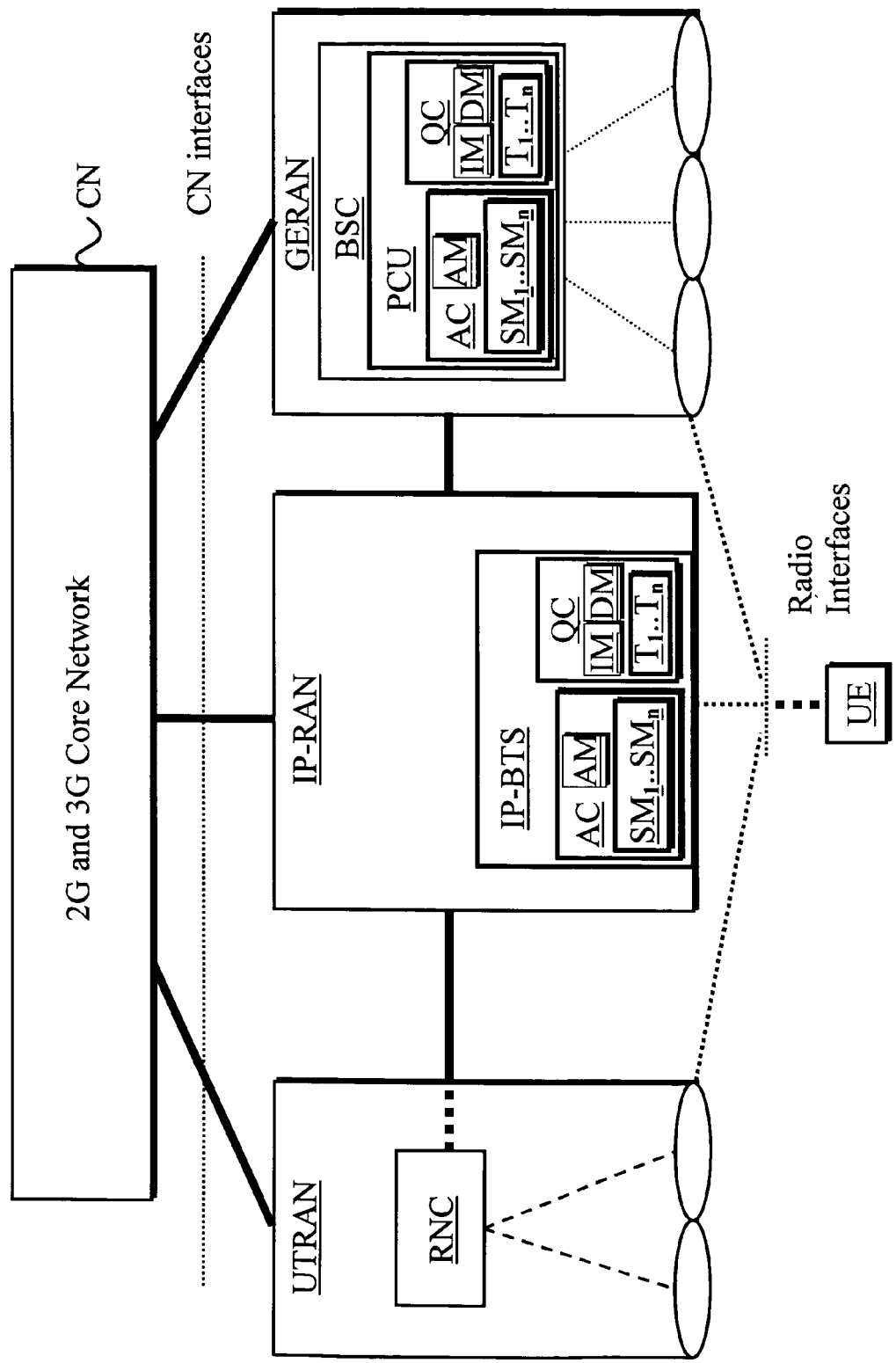
FIG. 3 is a block diagram illustrating a preferred embodiment of the system in accordance with the present invention.

FIG. 3 represents an exemplary embodiment of the systems where the present invention can be used. The architecture of FIG. 3 comprises three radio access networks: the UTRAN, IP-RAN and GERAN. The GERAN (GSM/EDGE radio access network) is an enhanced GSM radio access network. Enhanced here means that the GERAN uses the EDGE as a radio technology. The EDGE allows use of the UMTS services with 800/900/1800/1900 MHz frequency bands. The GERAN offers full advantages of GPRS (General Packet Radio System) to be explored. The base station subsystem (BSS) of the GERAN is connected to the GSM core network by Gb (between the BSS and a GSM SGSN) and A (between a BSS and a GSM MSC) interfaces. The BSS is further connected to the UMTS network by interfaces Iu-ps (between a BSS and a 3G SGSN) and Iu-cs (between a BSS and a 3G MSC). The BSS is further connected to the RNC of the UTRAN or to another BSS by Iur-g interface. The BSS includes a base station controller (BSC) and base transceiver stations (BTS). In the GERAN the air interface between the BTS and user equipment (UE) is called Um.

The IP-RAN (Internet Protocol Radio Access Network) is a RAN architecture that is fully optimised to carry IP traffic and is based on IP transport technology. In the IP-RAN, most of the functions of the centralised radio network controller (RNC and BSC) are moved to the base station IP-BTS. In this configuration the division of functionalities between network elements is fundamentally re-defined to suit the needs of IP traffic. This is clearly different from just using IP as a transport solution with the existing network architectures like the GSM (Global System for Mobile Communications) and the CDMA (Code Division Multiple Access) based radio access networks. The radio access networks are connected to the core network CN.

FIG. 3 comprises also user equipment UE The user equipment UE refers preferably to a mobile terminal, e.g. a mobile phone. The user equipment UE is connected to one or more radio access networks.

In FIG. 3, both the IP-BTS of the IP-RAN and the BSC of the GERAN comprise the Quality Control QC and Admission Control AC functions. In more detail, the Quality Control QC and Admission Control AC are located in the Packet Control Unit (PCU) in the GERAN. The Admission Control AC is arranged for accepting or denying a new data connection to the shared radio resources. The Quality Control QC is arranged for negotiating QoS parameter value(s) for each connection using the shared radio resources and for monitoring the experienced QoS for one or more data connections.

The Quality Control QC comprises means for detecting DM a degradation situation in the QoS of one or more data connections and means for indicating IM the degradation situation in the QoS to the Admission Control AC. Based on the degradation information the Admission Control AC changes the Admission Control policy for new data connections. Therefore, the Admission Control AC comprises means for adjusting AM the admission control policy of new data connections in response to the degradation situation in the QoS. The Admission Control AC comprises also one or more safety margins parameters $SM_1 \ldots SM_n$.

The Quality Control QC may also comprise one or more timers $T_1 \ldots T_n$, for measuring the duration of the degradation situation in the QoS. When the Quality Control QC notices that the experienced throughput for a streaming connection is less than the throughput negotiated as guaranteed, and this situation lasts a determined period of time, the Quality Control QC indicates Admission Control AC about the convenience of starting to block certain users that request guaranteed QoS to avoid the degradation in the provision of QoS for those users already admitted to the system.

The aforementioned means, safety margin parameters and timers are implemented in a way known to a man skilled in the art and therefore are not described in more detail.

Figure 4:
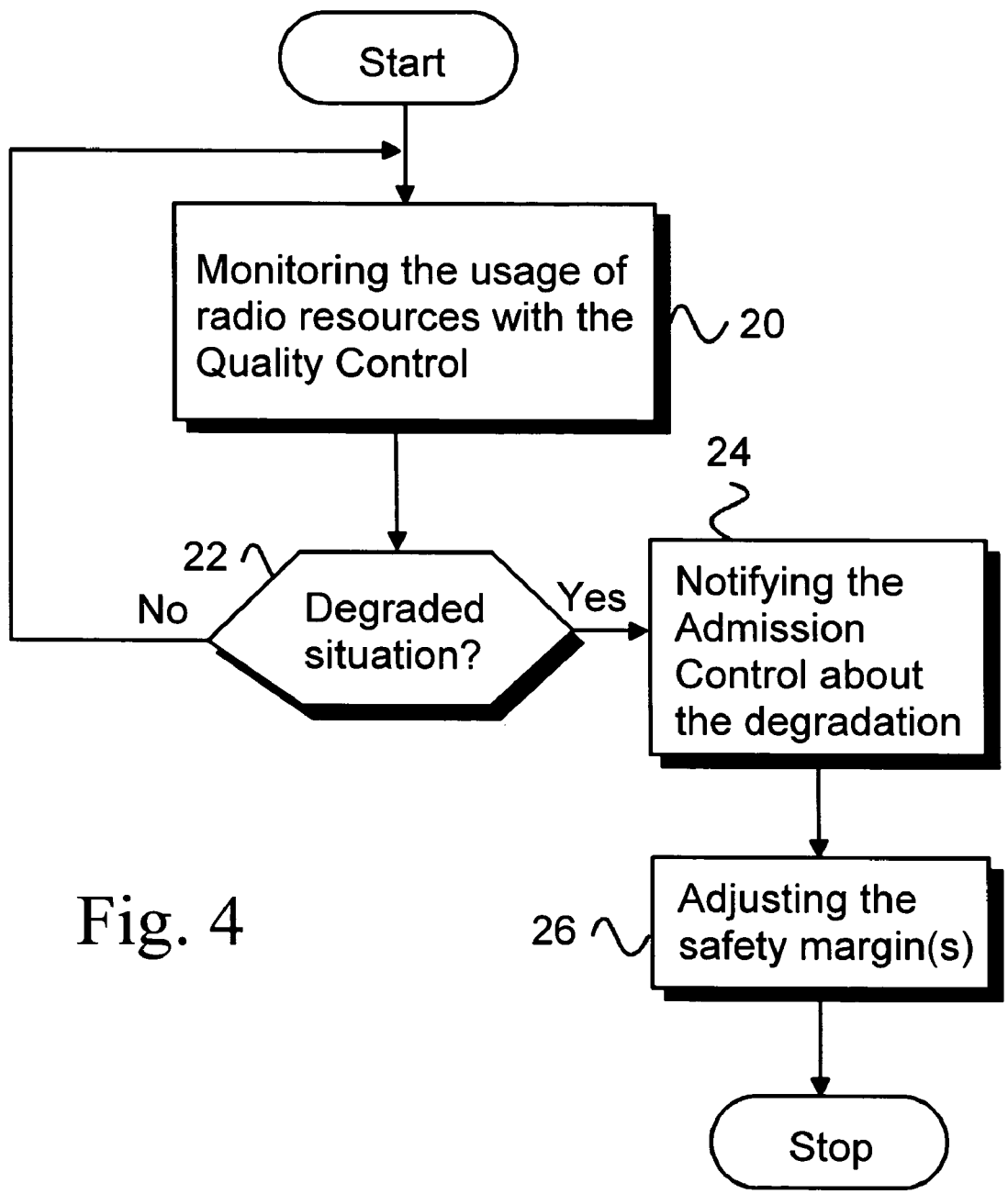
FIG. 4 is a flow diagram illustrating the functionality of a preferred embodiment of the present invention.

FIG. 4 is a flow diagram illustrating a general principle of how the Quality Control and the Admission Control operate together. For services that require a guaranteed throughput, as e.g. streaming services, the Admission Control needs some information in order to know whether there are available resources to guarantee QoS requirements (throughput requirements as guaranteed and maximum bitrate, and information about the quality of the radio channels such as network planning parameters and statistics). The radio channel quality information will be used to translate the throughput requirements from a mobile terminal application side into radio resources on the BSS/RAN side, i.e., into number of time slots needed to assure the guaranteed bitrate.

The criteria used for the Admission Control to decide whether a new streaming connection will be accepted or not is based on two concepts: needed capacity (for the new connection to assure its guaranteed bitrate) and used capacity (by the streaming connections allocated in the network). It may occur that in some instant an allocation request was accepted because radio conditions were appropriate to provide throughput requirements, but afterwards radio link conditions change in such a way that throughput requirements could not be fulfilled.

In order to prevent this problem in advance, safety margin concept has been defined as a percentage of the channel capacity that is used as additional capacity in the admission control algorithm calculations.

The function of the Quality Control is to monitor the satisfaction level of every user as well as the user satisfaction rate in the system (phase 20). The Quality Control indicates the degraded situation to the Admission Control (phases 22 and 24). By means of changes in the admission control policy it is possible to trigger counteracting actions by the Quality Control when QoS degradation is perceived. The Admission Control updates the safety margin(s) in response to the information received from the Quality Control (phase 26). Therefore, a new admission request would be accepted when the needed capacity of the incoming connection is lower than capacity used by the ongoing connections plus the safety margin(s). Otherwise, in case the needed capacity is higher, connection would not be admitted.

In one embodiment of FIG. 4, when the Quality Control notices that the experienced throughput for a streaming connection is less than the throughput negotiated as guaranteed, and this situation lasts a determined period of time, the Quality Control indicates the Admission Control about the convenience of starting to block certain users that request guaranteed QoS, such as streaming service users, to avoid the degradation in the provision of QoS for those users already admitted to the system. The Admission Control modifies its admission policy related to those connections able to share the resources of the aforementioned connections with throughput troubles. Thus, the Admission Control increases the safety margin for these particular connections in order to avoid new connections being allocated to the same channels (i.e. stop the admission of connections which are going to affect the ones in trouble because they both are sharing the bandwidth). Additionally, increasing the safety margin in such a way that the connection will be able to recover the throughput in an easier manner.

In one embodiment of FIG. 4, the user profile for updating the safety margin is taken into account, i.e. by categorising users e.g. into "gold", "silver" and "bronze" users, and to allow only "gold" users to update their safety margins, or define different ranges of variation for different user profiles.

In one embodiment of FIG. 4, a safety margin parameter is assigned separately to every data connection. Therefore, the safety margin parameters may differ among the users.

In another embodiment of FIG. 4, only one safety margin parameter is assigned, the safety margin being common for all data connections using the shared radio resources, i.e. the same channel. Therefore, this common safety margin is increased if the Quality Control detects that some connections are having bad quality.

The safety margin concept is a preventive solution for recovering from degraded QoS situations. When a degraded Qos situation is on, new connections willing to allocate onto the same channels may not be admitted at all.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method performed in a node of a network, the method comprising:
    negotiating, at a quality controller at the node, at least one of a quality of service parameter values for one or more data connections;
    monitoring, by the quality controller, an experienced quality of service for one or more data connections;
    assigning, by an admission controller at the node, at least one safety margin parameter for at least one data connection, the at least one safety margin referring to excess capacity in the shared radio resources;
    detecting, by the quality controller, a degradation situation in the quality of service of one or more data connections;
    indicating, by the quality controller to the admission controller, the degradation situation in the quality of service of one or more data connections to an admission control; and
    based on the degradation situation in the quality of service, adjusting, by the admission controller, an admission control policy of new data connections using the shared radio resources, wherein the node comprises at least one of a base station, a base station controller, a base transceiver station, and a radio network controller, wherein the shared radio resources are shared among at least two of the base station, the base station controller, the base transceiver station, and the radio network controller.

2. The method according to claim 1, further comprising:
    assigning a safety margin parameter separately to every data connection.

3. The method according to claim 2, wherein the safety margin parameters may differ from each other.

4. The method according to claim 2, wherein the safety margin parameters are different for each type of data connection.

5. The method according to claim 2, wherein the safety margin parameter is defined as a percentage of channel capacity that is used as additional used capacity in the admission control algorithm calculations.

6. The method according to claim 1, further comprising:
assigning one safety margin parameter common for all data connections using shared radio resources.

7. The method according to claim 1, further comprising:
adjusting safety margin parameter(s) in response to the degradation in the quality of service;
receiving a new data connection request to the shared radio resources; and
blocking the new data connection request if when the needed capacity is higher than the used capacity plus the safety margin(s).

8. The method according to claim 1, further comprising:
indicating the degradation situation in the quality of service to the admission control when the degradation situation has lasted a predetermined period of time.

9. The method according to claim 1, further comprising:
indicating the degradation situation in the quality of service to the admission control when noticing that the experienced throughput for a data connection is less than the negotiated one.

10. An apparatus, comprising:
an admission control configured to accept or deny a new data connection to the shared radio resources;
a quality control configured to negotiate quality of service parameter value(s) for each connection using the shared radio resources and to monitor an experienced quality of service for one or more data connections;
wherein the admission control comprises at least one safety margin parameter assigned for at least one data connection, the at least one safety margin referring to excess capacity assigned to the at least one data connection;
the quality control configured to detect a degradation situation in the quality of service of one or more data connections;
the quality control configured to indicate the degradation situation in the quality of service to an admission control; and
the admission control configured to adjust an admission control policy of new data connections in response to the degradation situation in the quality of service, wherein the apparatus is configured as at least one of a base station, a base station controller, a base transceiver station, and a radio network controller, and the shared radio resources are shared among at least two of the base station controller, the base transceiver station, and the radio network controller.

11. The apparatus according to claim 10, wherein the admission control comprises a safety margin parameter (SM1 ... SMn) assigned separately to every data connection.

12. The apparatus according to claim 11, wherein the safety margin parameters (SM1 ... SMn) may differ from each other.

13. The apparatus according to claim 11, wherein the safety margin parameter is defined as a percentage of channel capacity that is used as additional used capacity in the admission control algorithm calculations.

14. The apparatus according to claim 10, wherein the admission control comprises one safety margin parameter (SM1) common for all data connections using shared radio resources.

15. The apparatus according to claim 10, wherein the admission control comprises one or more safety margin parameters (SM1 ... SMn) being different for each type of data connection.

16. The apparatus according to claim 10, wherein the quality control comprises one or more timers (T1 ... Tn) for measuring the duration of the degradation situation in the quality of service.

17. The apparatus according to claim 10, wherein the apparatus is an internet protocol base transceiver station of an internet protocol radio access network.

18. The apparatus according to claim 10, wherein the comprises a base station controller of the a GERAN.

19. An apparatus, comprising:
means for negotiating quality of service parameter value(s) for one or more data connections;
means for monitoring an experienced quality of service for one or more data connections;
means for assigning at least one safety margin parameter for at least one data connection, the at least one safety margin referring to excess capacity in the shared resources;
means for detecting a degradation situation in the quality of service of one or more data connections;
means for indicating the degradation situation in the quality of service of one or more data connections to an admission control; and
based on the degradation situation in the quality of service, means for adjusting an admission control policy of new data connections using the shared radio resources, wherein the apparatus is configured as at least one of a base station, a base station controller, a base transceiver station, and a radio network controller, and the shared radio resources are shared among at least two of the base station controller, the base transceiver station, and the radio network controller.

* * * * *